(12) United States Patent
Sexton

(10) Patent No.: US 11,613,346 B2
(45) Date of Patent: Mar. 28, 2023

(54) AIRCRAFT LANDING GEAR ASSEMBLY AND METHOD

(71) Applicant: Safran Landing Systems UK LTD, Gloucester (GB)

(72) Inventor: Matthew Sexton, Gloucester (GB)

(73) Assignee: SAFRAN LANDING SYSTEMS UK LTD, Gloucester (GB)

( * ) Notice: Subject to any disclaimer, the term of this patent is extended or adjusted under 35 U.S.C. 154(b) by 21 days.

(21) Appl. No.: 17/265,203

(22) PCT Filed: Jul. 25, 2019

(86) PCT No.: PCT/EP2019/070033
§ 371 (c)(1),
(2) Date: Feb. 1, 2021

(87) PCT Pub. No.: WO2020/025439
PCT Pub. Date: Feb. 6, 2020

(65) Prior Publication Data
US 2021/0347467 A1 Nov. 11, 2021

(30) Foreign Application Priority Data
Aug. 2, 2018 (EP) .................................... 18186980

(51) Int. Cl.
*B64C 25/12* (2006.01)
*B33Y 80/00* (2015.01)

(52) U.S. Cl.
CPC .............. *B64C 25/12* (2013.01); *B33Y 80/00* (2014.12)

(58) Field of Classification Search
CPC .......... B64C 25/12; B64C 25/02; B33Y 80/00
See application file for complete search history.

(56) References Cited

U.S. PATENT DOCUMENTS 10,563,690 B2 * 2/2020 Himmelmann ........... F16C 7/02

FOREIGN PATENT DOCUMENTS

EP 1 736 674 A1 12/2006
EP 2 886 448 A1 6/2015
(Continued)

OTHER PUBLICATIONS

European Search Report issued in European Application No. 18186980.1 dated Jan. 14, 2019.
(Continued)

*Primary Examiner* — Rick K Chang
(74) *Attorney, Agent, or Firm* — Womble Bond Dickinson (US) LLP

(57) ABSTRACT

An aircraft landing gear assembly and method method of constructing an aircraft landing gear component. The assembly includes a ground contacting part, an aircraft attachment part, and a component. The component includes a first base member and a second base member separated along a first longitudinal axis, a plurality of first connecting points on the first base member arranged in a first regular polygon, a plurality of second connecting points on the second base member arranged in a second regular polygon. The second regular polygon has the same number of sides as the first regular polygon, and a plurality of first straight beams fixed to the first and second base members at the first and second connecting points and extending between the first and second base members, each beam aligned skew to the longitudinal axis.

18 Claims, 8 Drawing Sheets

(56) References Cited

FOREIGN PATENT DOCUMENTS

| | | |
|---|---|---|
| EP | 3 275 780 A1 | 1/2018 |
| FR | 3 035 605 A1 | 11/2016 |
| GB | 2 494 782 A | 3/2013 |

OTHER PUBLICATIONS

Internation Search Report issued in PCT/EP2019/070033 dated Sep. 24, 2019.
https://en.wikipedia.org/wiki/Hyperboloid_structure; pp. 1-8(2021).

* cited by examiner

AIRCRAFT LANDING GEAR ASSEMBLY AND METHOD

CROSS REFERENCE TO RELATED APPLICATIONS

The present application claims priority under 35 U.S.C. § 119 to European PCT Application No. PCT/EP2019/070033, filed on Jul. 25, 2019, which claims priority to European Provisional Patent Application No. 18186980.1, filed on Aug. 2, 2018. The entire contents of these applications are hereby incorporated by reference in their entirety.

BACKGROUND

The weight of an aircraft craft landing gear assembly can adversely affect the fuel consumption of an aircraft of which it forms a part.

The present inventor has devised a new type of an aircraft landing gear component which can be of reduced weight in comparison to known corresponding aircraft landing gear components and can be incorporated into an aircraft landing gear assembly.

SUMMARY

A first aspect of at least one embodiment of the invention provides an aircraft landing gear assembly comprising: a ground contacting part, an aircraft attachment part, and a component comprising: a first base member and a second base member separated along a first longitudinal axis, a plurality of first connecting points on the first base member arranged in a first regular polygon, a plurality of second connecting points on the second base member arranged in a second regular polygon, the second regular polygon having the same number of sides as the first regular polygon, and a plurality of first straight beams fixed to the first and second base members at the first and second connecting points and extending between the first and second base members, each beam aligned skew to the longitudinal axis.

With such an arrangement, there is provided an aircraft landing gear component having a hyperboloid shape and having a lower weight.

The component of the aircraft landing gear assembly can further comprise a plurality of first hoops, each first hoop being coupled to at least two of the first beams, the first hoops being arranged in a plane normal to the first longitudinal axis.

With such an arrangement, the beams can be better stabilised.

The first beams can be convergent from the first regular polygon to the second regular polygon.

With such an arrangement, a stronger landing gear component can be formed, since the minimum cross sectional area defined by the beams is at a base member.

The plurality of first beams can comprise at least five beams.

With such an arrangement, the beams can be made more lightweight.

The plurality of first beams can comprise intersecting beams. Optionally, the beams intersect at an angle of between 80° and 40°, further optionally, the beams intersect at an angle of between 70° and 50°.

With such an arrangement, the component can have better torsional stiffness.

The component of the aircraft landing gear assembly can further comprise: a third base member separated from the second base member along a second longitudinal axis, a plurality of third connecting points on the second base member arranged in a third regular polygon, a plurality of fourth connecting points arranged on the third base member in a fourth regular polygon, the fourth regular polygon having the same number of sides as the third regular polygon, and a second plurality of straight beams fixed to the second and third base members at the third and fourth connecting points and extending between the second and third base members, each beam aligned skew to the second longitudinal axis.

With such an arrangement, a greater variety of shapes of aircraft landing gear component can be formed.

The first and second longitudinal axes can be collinear.

The aircraft landing gear can further comprise a plurality of second hoops, each second hoop being coupled to at least two of the second beams, the second hoops being arranged in a plane normal to the second longitudinal axis.

With such an arrangement, the second beams can be better stabilised.

The second beams can be convergent from the third regular polygon to the fourth regular polygon.

With such an arrangement, a stronger landing gear component can be formed, since the minimum cross sectional area defined by the beams is at a base member.

The second regular polygon can be larger than the first regular polygon. With such an arrangement, the landing gear component can have better stiffness in bending.

The third regular polygon can be larger than the fourth regular polygon. With such an arrangement, the landing gear component can have better stiffness in bending.

The plurality of second beams can comprise at least five beams. With such an arrangement, the beams can be made more lightweight.

The plurality of second beams can comprise intersecting beams. With such an arrangement, the landing gear component can have better torsional stiffness.

At least one, optionally two, of the base members can be a lug for attaching the aircraft landing gear component to a second aircraft landing gear component.

Equally, the lug could be arranged for connection to a component of an airframe.

The aircraft landing gear component can be a landing gear strut.

The beams can be formed by additive layer manufacturing.

According to a second aspect of at least one embodiment of the present invention, there is provided a method of constructing an aircraft landing gear component comprising forming first and/or second plurality of beams by additive layer manufacturing.

The method can further comprise welding the first and/or second plurality of beams to one of the base members.

While the present disclosure is related to an entire aircraft landing gear assembly, it will be understood that the component can be separated from the aircraft landing gear assembly.

The component can also be used an aircraft assembly which is not a landing gear assembly.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
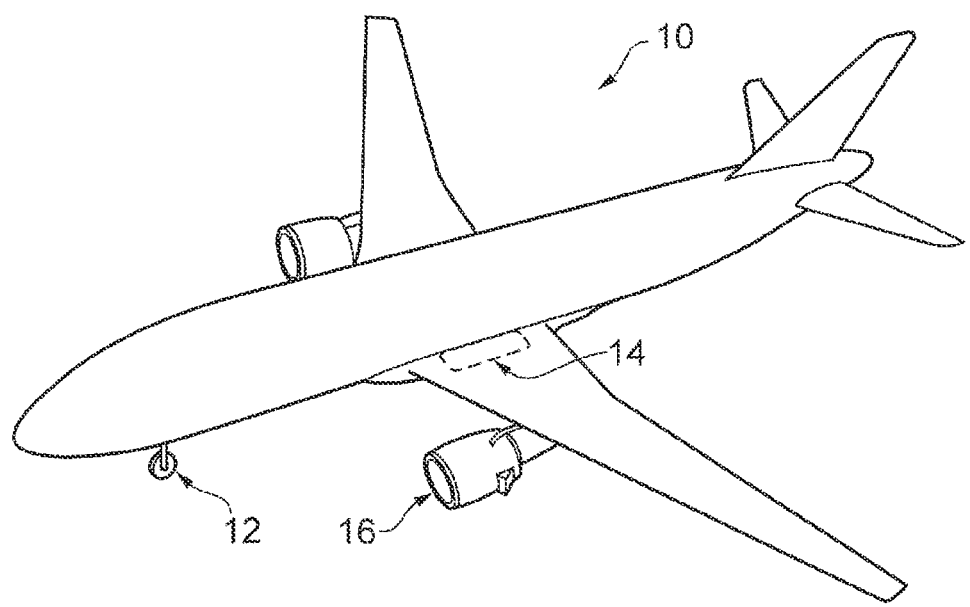
FIG. 1 is a diagram of an aircraft.

FIG. 1 is a diagram of an aircraft 10. The aircraft 10 includes assemblies such as a nose landing gear 12, main landing gear 14 and engines 16. Other aircraft assemblies will be apparent to the skilled person. An aircraft assembly can be a group of interconnected parts which are arranged to be fitted to one or more other aircraft assemblies as a unit. The term aircraft as used herein includes aeroplanes, helicopters, UAVs and the like.

Referring now to FIGS. 2a to 2e, an aircraft assembly, namely an aircraft landing gear assembly, is shown generally at 14. The landing gear assembly 14 includes a foldable stay 18, a lock link 20 and a down lock spring assembly 22 mounted to the stay 18 and arranged to urge the lock link 20 to assume a locked state. The landing gear assembly also includes a main shock absorber strut 24, comprising a main fitting 26 and a sliding tube 28, as well as a pair of wheel and brake assemblies 30 pivotally coupled to a lower end of the sliding tube 28 via an elongate bogie beam.

The aircraft landing gear assembly is movable between a deployed condition for take-off and landing, and a stowed condition for flight. An actuator (not shown) is provided for moving the landing gear between the deployed condition and the stowed condition. This actuator is known in the art as a retraction actuator, and more than one can be provided. A retraction actuator can have one end coupled to the airframe and another end coupled to the main strut such that extension and retraction of the actuator results in movement of the main strut between deployed and stowed conditions.

Figure 2A:
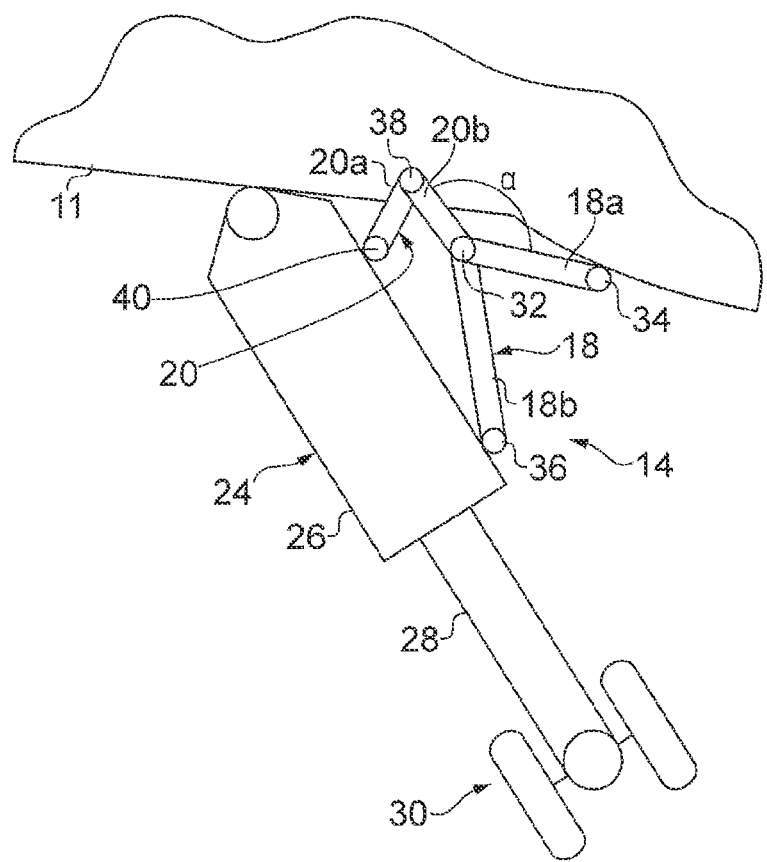
FIGS. 2a to 2e are diagrams of an aircraft landing gear assembly.
Figure 2B:
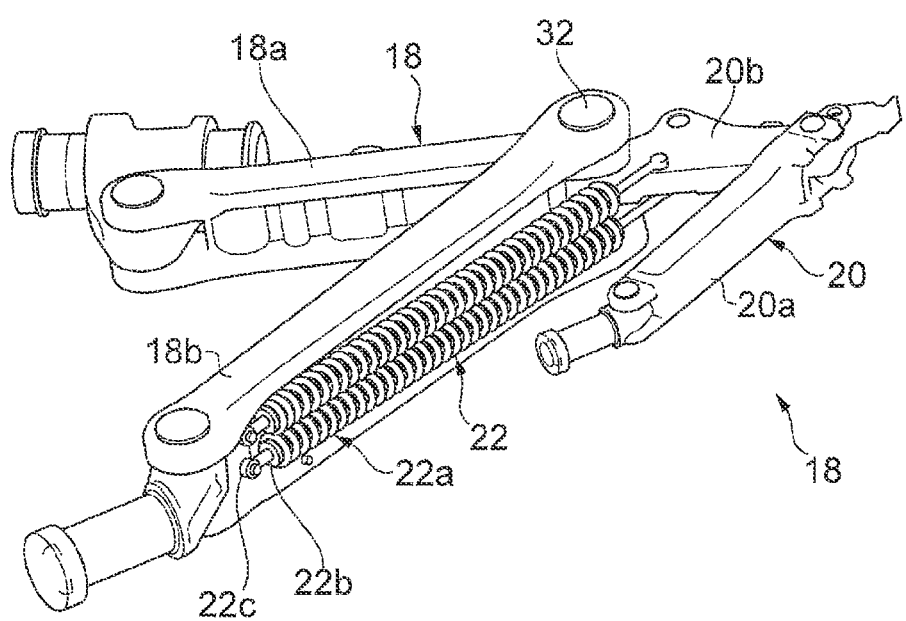
Figure 2C:
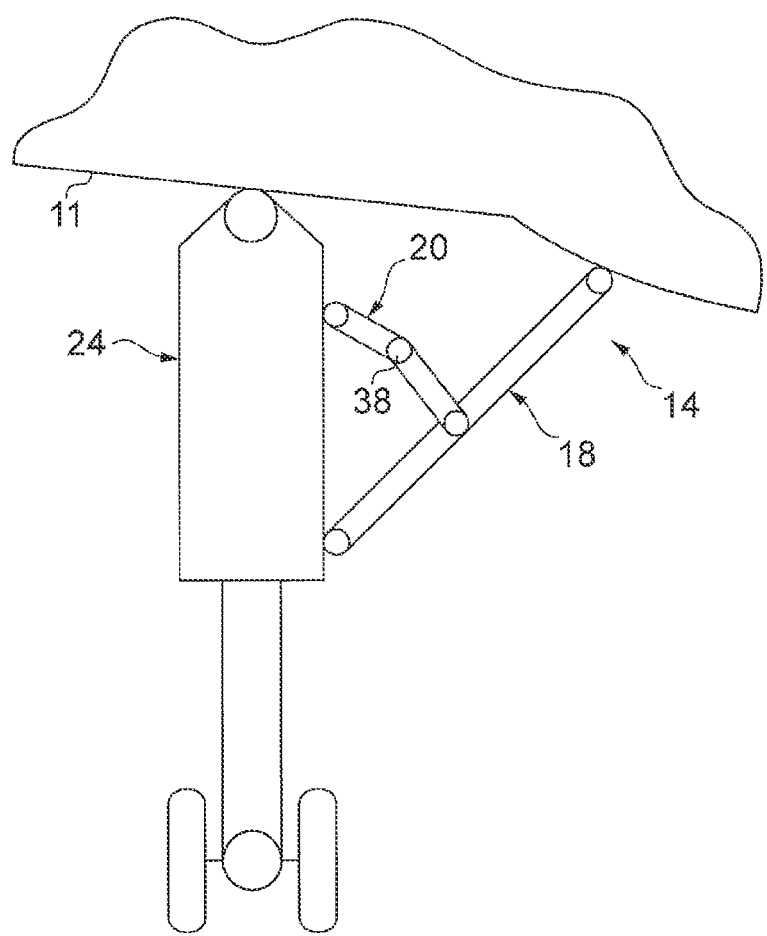

The stay 18 serves to support the orientation of the main fitting 26 when the landing gear is in the deployed condition. The stay 18 generally includes a two bar linkage that can be unfolded to assume a generally straight or aligned over centre condition in which the stay 18 is locked to inhibit movement of the main fitting, as shown in FIGS. 2c and 2e. When the stay is broken, it no longer prevents pivotal movement of the main fitting 26 and the main fitting 26 can be moved by the retraction actuator towards the stowed condition, as shown in FIG. 2a. During flight the stay 18 is arranged in the folded condition, while during take-off and landing the stay 18 is arranged in the generally straight or aligned condition. Some main landing gear assemblies include a pair of stays coupled to a common shock absorbing strut.

The stay 18 has an elongate upper stay arm 18a having a lower end defining a pair of lugs pivotally coupled via a pivot pin 32 to a pair of lugs defined at an upper end of an elongate lower stay arm 18b. The stay arms 18a and 18b can therefore pivotally move relative to one another about the pivot pin 32. The upper end of the upper stay arm 18a defines a pair of lugs that are pivotally coupled to a lug of a connector 34 which in turn is pivotally coupled to the airframe 11. The lower end of the lower stay arm 18b defines a pair of lugs pivotally coupled to a lug of a connector 36 which in turn is pivotally coupled to the main fitting 26.

The lock link 20 has an elongate upper link arm 20a having a lower end pivotally coupled to an upper end of an elongate lower link arm 20b via a pivot pin 38. The link arms 20a, 20b can therefore pivotally move relative to one another about the pivot pin 38. An upper end of the upper link arm 20a defines a pair of lugs that are pivotally coupled to a lug of a connector 40 which in turn is pivotally coupled to the main strut 26. A lower end of the lower link arm 20b defines a lug that is pivotally coupled to lugs of the stay arms 18a, 18b via the pivot pin 32. Lugs of the upper stay arm 18a are disposed between the lugs of the lower stay arm 18b and the lugs of the lower link arm 20b.

Figure 2D:
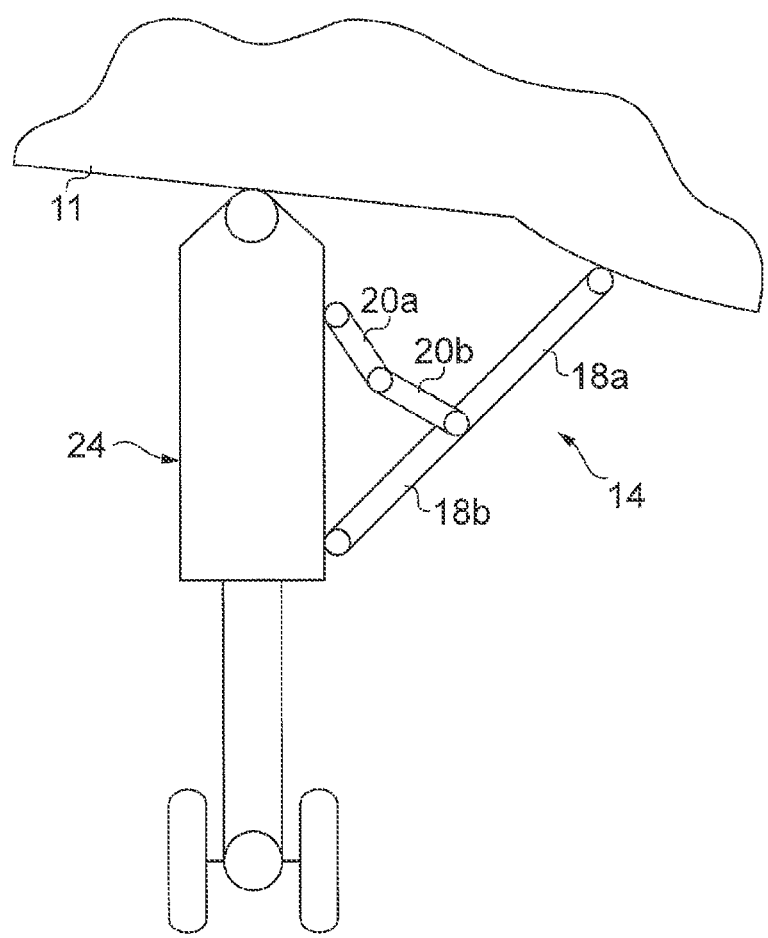
Figure 2E:
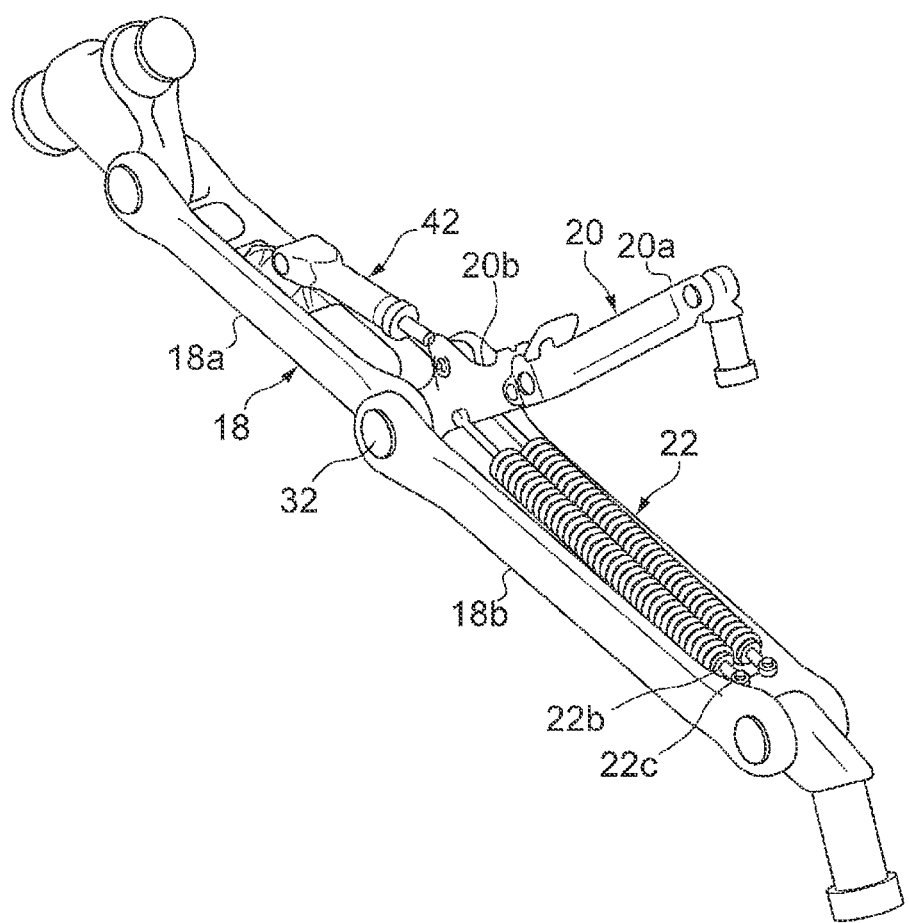

When the lock link 20 is in the locked condition, as illustrated in FIGS. 2d and 2e, the upper and lower link arms 20a, 20b are generally longitudinally aligned or coaxial, and can be 'over-centre', such that the lock link 20 is arranged to oppose a force attempting to fold the stay 18, so as to move the landing gear assembly from the deployed condition towards the stowed condition. The lock link 20 must be broken to enable the stay 18 to be folded, thereby permitting the main fitting 26 to be moved by the retraction actuator towards the stowed condition.

One or more down lock springs 22 are generally provided to assist in moving the landing gear assembly to the deployed condition and locking it in that state by making the lock link. Down lock springs 22 also inhibit the lock link accidentally being unlocked. Down lock springs 22 are generally titanium alloy coil springs, which can be coupled between the lock link and another part of the landing gear assembly, such as an arm of the stay assembly, as shown in FIGS. 2b and 2e.

The spring assembly 22 is arranged to bias the lock link 20 towards the locked condition by way of spring tension. A distal end of the spring 22a is coupled to the lower stay arm 18b via a lower engagement formation 22b which in turn is coupled to an anchor point defined by the lower connector 22c.

The coil spring of the spring assembly 26 is at its shortest when the landing gear assembly is in the deployed condition, as shown in FIG. 2e, and at its longest when the landing gear assembly approaches the stowed condition, as shown in FIG. 2b. As the landing gear assembly is retracted towards the stowed condition, the spring of each spring assembly extends, resulting in increased spring load and torsional stress.

Referring to FIG. 2e, a lock stay actuator 42 is coupled between the upper stay arm 18a and lower link arm 20b and is arranged to pivotally move the link arms 20a, 20b so as to 'lock' and 'unlock' the lock link 20, as illustrated in FIG. 2c. The actuator 42 can break the lock link 20 against the down lock spring bias, allowing the landing gear assembly to be folded and stowed as described previously.

As will be appreciated from the above, various aircraft assemblies include a structural element which, in use, is arranged to directly or indirectly react load applied to it by another assembly of the aircraft; for example, an outer cylinder (main fitting) or inner cylinder (sliding tube) of an aircraft assembly shock absorbing strut, a bogie or truck beam, side stays or lock stays, axles and wheel levers.

Figure 3:
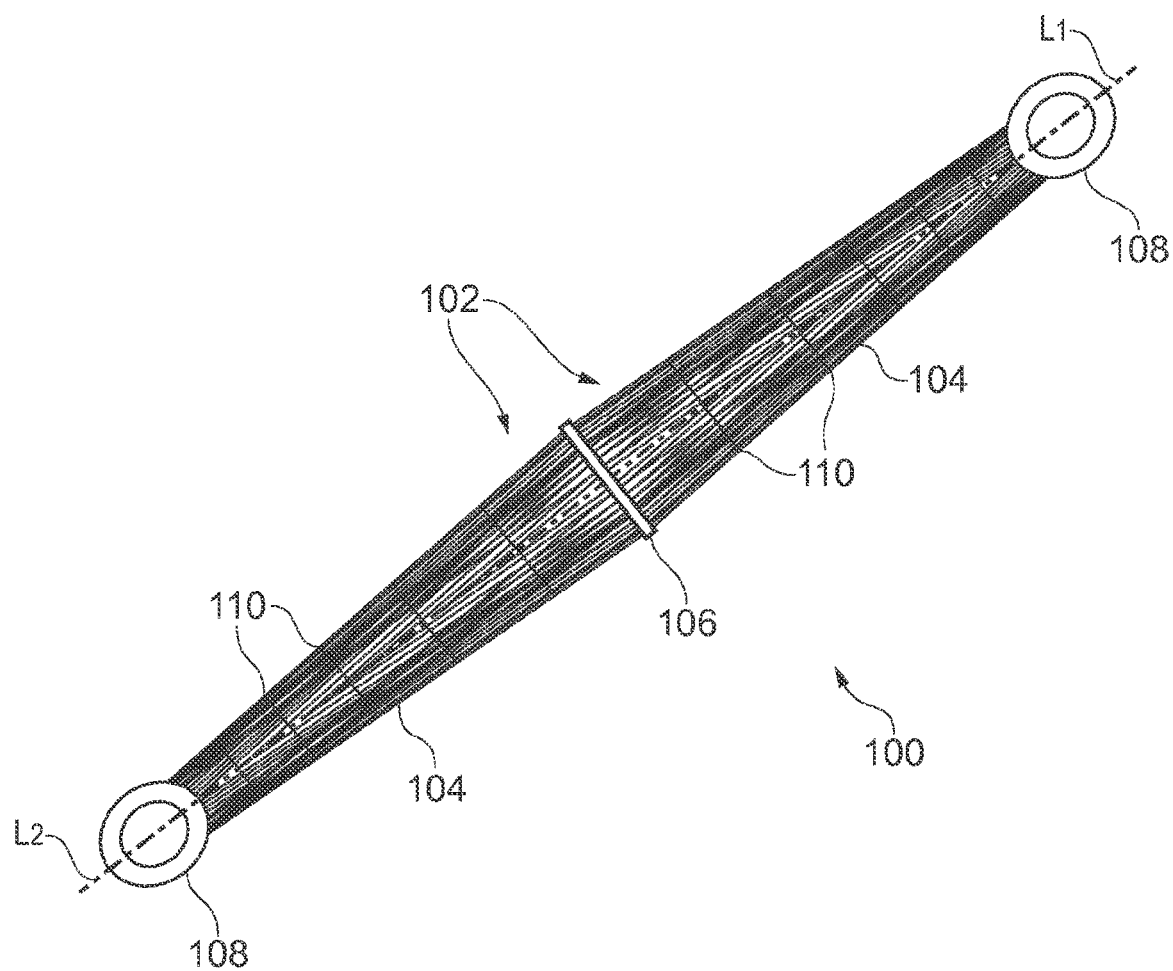
FIG. 3 is a diagram of an aircraft assembly according to an embodiment of the invention.
Figure 4:
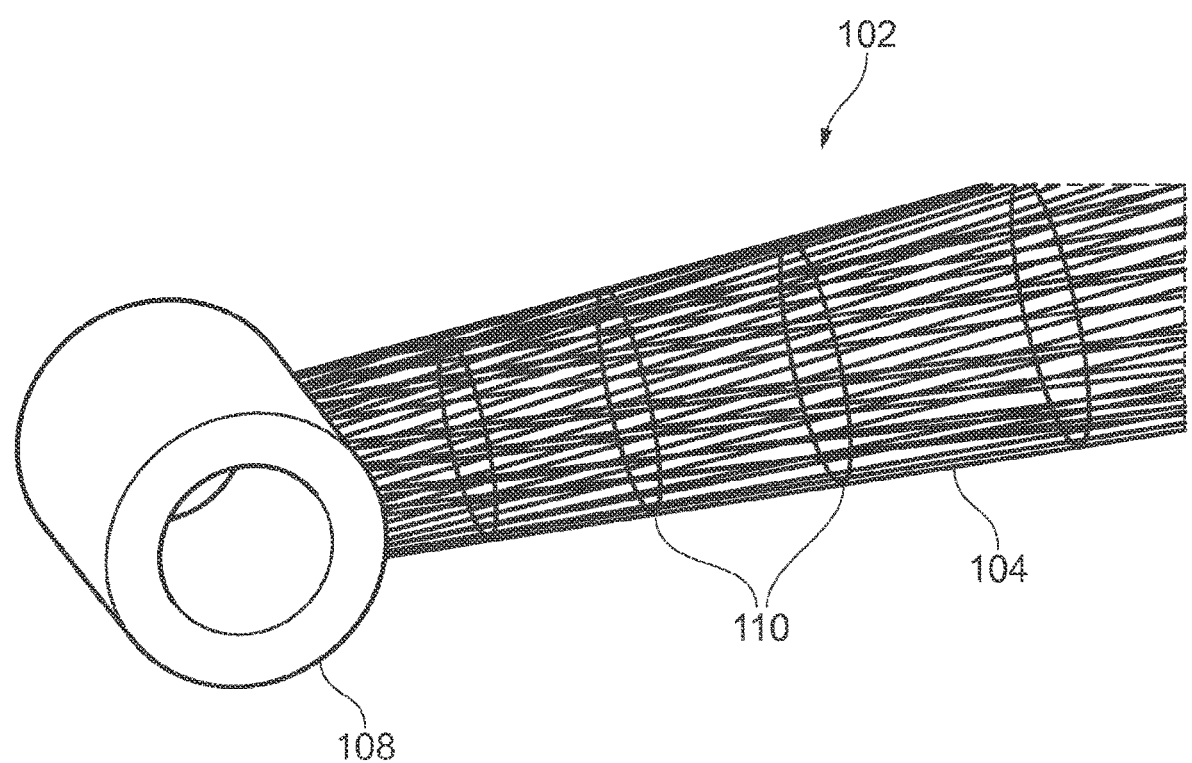
FIG. 4 is a magnified view of part of the aircraft assembly.

FIG. 3 shows a landing gear component 100, which can be incorporated within a landing gear assembly according to an embodiment of the invention.

The landing gear component 100 can form a strut of a landing gear, or may be any one of a stay, a brake rod, a brace member, or any other link in tension or compression.

The landing gear component 100 is substantially formed from two hyperboloid structures 102. The hyperboloid structures 102 are each formed of a plurality of straight beams 104. The straight beams 104 are each connected to a joining ring 106 and a lug 108. The joining ring 106 is separated from each lug 108 along a longitudinal axis L1, L2 which runs between midpoints of the joining ring 106 and the respective lug 108. Hoops 110 are arranged substantially normal to the longitudinal axis L1, L2 and are fixed to the beams 104.

The straight beams 104 are connected to the joining ring 106 and lug 108 in a substantially circular arrangement. As will be understood by a person skilled in the art, the points at which the beams 104 join the joining ring 106 will approximate a circle and will form the vertices of a regular polygon. Equally, the outside shape of the structure formed by the beams 104 will not be a true hyperboloid, but will approximate one. The hyperboloid shape formed may be any section of a hyperboloid shape; it does not require that the overall shape has a converging-diverging quality.

The hyperboloid shape is achieved by the plurality of beams 104 each running skew to the longitudinal axis L1, L2 (i.e. non-parallel with the axis and not on a line intersecting the axis). As explained above, the beams 104 join the joining ring 106 in such a way that the joining points form a regular polygon. A similar regular polygon will be formed by the points where the beams 104 join the lug 108. However, the polygon of joining points formed on the lug 108 will be rotated about the longitudinal axis L1, L2 relative to the polygon formed on the joining ring 106.

The beams 104, and optionally the hoops 110, can be formed by an additive manufacturing process. In such a process, the joining ring 106 can be used as a foundation and the beams 104 and hoops 110 can be formed by additive process where the structure is built upon the joining ring 106. Lugs 108 can then be welded onto the beams 104 for example.

While a joining ring 106 is illustrated, the joining ring 106 can be replaced by a cube or sphere. Such an arrangement would allow the axes L1, L2 to be non-collinear, for example when forming an L-shaped component.

The component 100 can be formed with only a single hyperboloid structure 102. For more simple components, only a single hyperboloid structure 102 might be necessary.

The above-disclosed example also has only a single regular polygon formed by the points where the beams 104 join the lugs 108 and joining ring 106. However, the beams 104 may join the lugs 108 and/or joining ring 106 such that more than one regular polygon is formed, for example there may be multiple overlapping hyperboloid structures 102 formed.

It will be understood that the beams 104 and the hoops 110 may all be formed simultaneously using an additive layer manufacturing process. Such a process would have the effect that the beams 104 and the hoops 110 may intersect without any join lines, and can form a continuous structure.

The landing gear component 100 can be covered with a covering (not shown). Such a covering can be a structural, plated surface which increases the structural rigidity of the landing gear component 100. The covering can also be non-structural and can improve the aerodynamic properties of the landing gear component 100, such as by reducing aeroacoustic noise.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
    a ground contacting part,
    an aircraft attachment part, and
    a component comprising:
        a first base member and a second base member separated along a first longitudinal axis,
        a plurality of first connecting points on the first base member arranged in a first regular polygon,
        a plurality of second connecting points on the second base member arranged in a second regular polygon, the second regular polygon having an equal number of sides as the first regular polygon, and
        a plurality of first straight beams fixed to the first and second base members at the first and second connecting points and extending between the first and second base members, each beam aligned skew to the longitudinal axis,
        wherein the plurality of first beams comprises intersecting beams.

2. The aircraft landing gear assembly of claim 1, wherein the component further comprises a plurality of first hoops, each first hoop being coupled to at least two of the first beams, the first hoops being arranged in a plane normal to the first longitudinal axis.

3. The aircraft landing gear assembly of claim 1, wherein the first beams are convergent from the first regular polygon to the second regular polygon.

4. The aircraft landing gear assembly of claim 1, wherein the plurality of first beams comprises at least five beams.

5. The aircraft landing gear assembly of claim 1, wherein the component further comprises:
    a third base member separated from the second base member along a second longitudinal axis,
    a plurality of third connecting points on the second base member arranged in a third regular polygon,
    a plurality of fourth connecting points arranged on the third base member in a fourth regular polygon, the fourth regular polygon having the same number of sides as the third regular polygon, and
    a second plurality of straight beams fixed to the second and third base members at the third and fourth connecting points and extending between the second and third base members, each beam aligned skew to the second longitudinal axis.

6. The aircraft landing gear assembly of claim 5, wherein the component further comprises a plurality of second hoops, each second hoop being coupled to at least two of the second beams, the second hoops being arranged in a plane normal to the second longitudinal axis.

7. The aircraft landing gear assembly of claim 5, wherein the second beams are convergent from the third regular polygon to the fourth regular polygon.

8. The aircraft landing gear assembly of claim 5, wherein the second regular polygon is larger than the first regular polygon.

9. The aircraft landing gear assembly of claim 5, wherein the plurality of second beams comprises at least five beams.

10. The aircraft landing gear assembly of claim 5, wherein the plurality of second beams comprises intersecting beams.

11. The aircraft landing gear assembly of claim 1, wherein at least one of the base members is a lug for attaching the aircraft landing gear component to a second aircraft landing gear component or to an airframe component.

12. The aircraft landing gear assembly of claim 1, wherein the component is a landing gear strut.

13. The aircraft landing gear assembly of claim 1, wherein the beams are formed by additive layer manufacturing.

14. A method of constructing an aircraft landing gear component according to claim 1, the method comprising:
   forming the first and/or second plurality of beams by additive layer manufacturing.

15. The aircraft landing gear assembly of claim 5, wherein the third regular polygon is larger than the fourth regular polygon.

16. The aircraft landing gear assembly of claim 1, wherein at least two of the base members is a lug for attaching the aircraft landing gear component to a second aircraft landing gear component or to an airframe component.

17. An aircraft landing gear assembly comprising:
   a ground contacting part,
   an aircraft attachment part, and
   a component comprising:
      a first base member and a second base member separated along a first longitudinal axis,
      a plurality of first connecting points on the first base member arranged in a first regular polygon,
      a plurality of second connecting points on the second base member arranged in a second regular polygon, the second regular polygon having an equal number of sides as the first regular polygon, and
      a plurality of first straight beams fixed to the first and second base members at the first and second connecting points and extending between the first and second base members, each beam aligned skew to the longitudinal axis, wherein the first straight beams are non-parallel and lie along lines that are non-intersecting and are not coplanar.

18. An aircraft landing gear assembly comprising:
   a ground contacting part,
   an aircraft attachment part, and
   a component comprising:
      a first base member and a second base member separated along a first longitudinal axis,
      a plurality of first connecting points on the first base member arranged in a first regular polygon,
      a plurality of second connecting points on the second base member arranged in a second regular polygon, the second regular polygon having an equal number of sides as the first regular polygon, and
      a plurality of first straight beams fixed to the first and second base members at the first and second connecting points and extending between the first and second base members, each beam aligned skew to the longitudinal axis, wherein the first straight beams are fixed to the first and second base members at the first and second connecting points such that the first straight beams are immovable relative to the first and second base members.

* * * * *